Aug. 14, 1923.

R. E. CLASSON 1,465,158

HITCH

Filed May 24, 1921   2 Sheets-Sheet 1

R. E. Classon
INVENTOR

BY Victor J. Evans
ATTORNEY

WITNESSES:

Aug. 14, 1923.

R. E. CLASSON

HITCH

Filed May 24, 1921  2 Sheets-Sheet 2

1,465,158

Patented Aug. 14, 1923.

1,465,158

UNITED STATES PATENT OFFICE.

RAYMOND E. CLASSON, OF RADCLIFFE, IOWA.

HITCH.

Application filed May 24, 1921. Serial No. 472,259.

*To all whom it may concern:*

Be it known that I, RAYMOND E. CLASSON, a citizen of the United States, residing at Radcliffe, in the county of Hardin and State of Iowa, have invented new and useful Improvements in Hitches, of which the following is a specification.

This invention relates to improvements in hitches for connecting tractors to implements, the principal object of the invention being to provide means for disconnecting the hitch from the tractor if the implement should strike an obstruction, thus preventing damage to either the implement or tractor.

Another object of the invention is to provide means whereby the hitch can be again connected with the tractor by simply backing the tractor against the hitch and without necessitating the operator leaving the tractor.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
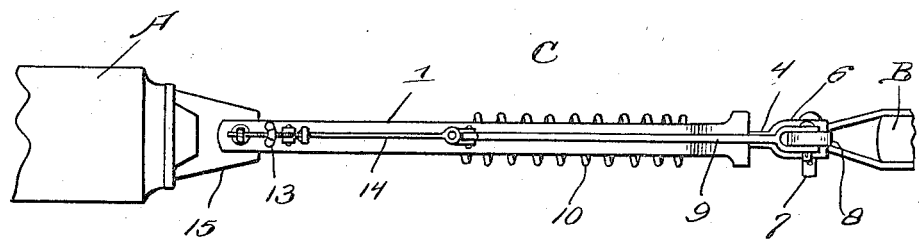
Figure 1 is a side view showing a portion of a tractor and implement connected together by my improved hitch.
Figure 3:
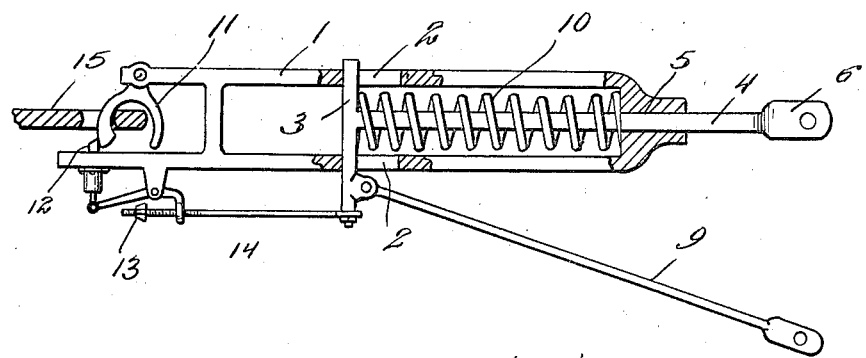
Figure 3 is a plan view thereof.
Figure 2:
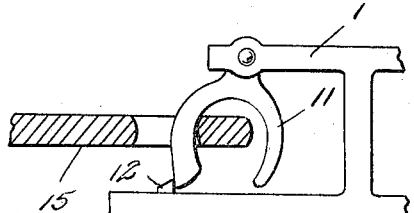
Figure 2 is an enlarged view of a hitch.
Figure 4:
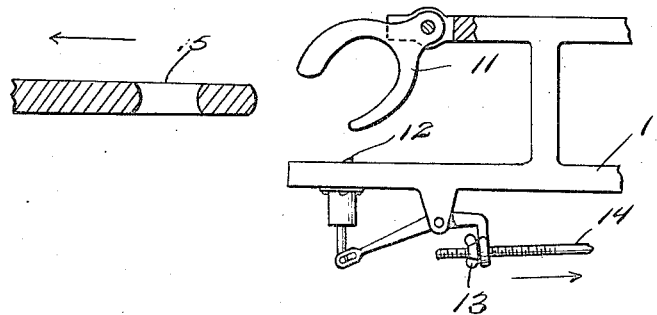
Figures 4 and 5 are detail views.
Figure 5:
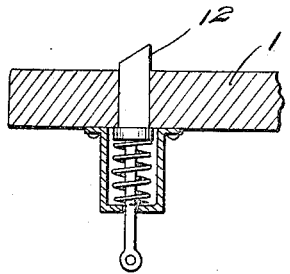
Figure 6:
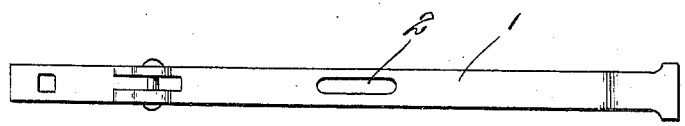
Figure 6 is a bottom plan view of the frame.

In these views A indicates a tractor and B the implement, C indicating the hitch for connecting the tractor with the implement. This hitch comprises a yoke frame 1, the side pieces of which have slots 2 therein for receiving the ends of the cross bar 3 so that said cross bar is bodily movable in the frame. A draw bar 4 has one end connected with the bar 3 and its other end passing through an opening 5 in the bight of the yoke frame, this end being provided with a fork 6 which is adapted to receive the coupling pin 7 for connecting the draw bar to the clevis 8 of the implement. A brace bar 9 is pivotally secured to the lower end of the bar 3 and has its other end pivotally secured to a part of the implement. A spring 10 surrounds the bar 4 and has one end abutting the bar 3 and its other end the bight of the yoke frame. This spring tends to hold the bar 3 against the far ends of the slots as will be understood.

A forked piece 11 constituting a releasable draft hook is pivoted to the upper limb of the yoke frame adjacent its outer end and a trigger 12 is carried by the lower limb, this trigger engaging the outer prong of fork 11 to hold the said fork against outward movement. The trigger is adapted to be moved into releasing position by means of a nut 13 on the rod 14 which is connected with the cross bar 3. Nut 13 can be adjusted on the bar 14 so as to have the trigger operate after a certain movement of the bar 3.

The releasable draft hook 11 is adapted to be engaged by the draw bar 15 of the tractor, the trigger 12 acting to hold the parts in engagement. If the implement struck an obstruction the spring 10 would be contracted by the relative movement of the frame 1 and bars 3 and 4 and this movement will cause the nut 13 and bar 14 to strike and operate the trigger, thus releasing the hook 11 and permitting the same to swing outwardly and thus release the tractor from the hitch. This will prevent injury to the parts and if the tractor is to be connected again with the implement it is simply necessary to back the tractor to cause the draw bar 15 to engage the hook, this movement causing the hook to swing inwardly so that it will be again engaged by the trigger. Thus the tractor can be hitched to the implement without the operator leaving the tractor.

The spring 10 must be of sufficient strength to prevent movement of the parts under ordinary plowing conditions so that the parts will not actuate unless an unusual strain is placed upon them.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A hitch of the class described comprising a yoke-shaped frame having slots in its side bars, a cross bar having its ends located in said slots, a draw bar connected with said cross bar, a spring on said draw bar having its ends engaging said cross bar and the bight of the yoke frame, a draft hook pivotally mounted in the yoke frame, a trigger for holding the same in locking position, a rod connected with the cross bar and a nut adjustable on the rod for engaging a part of the trigger to move the same into releasing position when the draw bar and cross bar are moved.

2. A hitch of the character specified comprising an elongated frame presenting upper and lower members, a draft bar slidable between the said members at one end of the said frame, an outwardly swinging draft hook pivotally suspended between the said members at the opposite end of the frame, said hook supported from the upper member and presenting spaced prongs adjacent the lower member, a trigger associated with the said lower member and movable thru the latter to prevent the outward swing of the said hook, a trigger actuating connection between the said trigger and the said draft bar, and a spring yieldably holding the said bar in position to retain the trigger in restraining engagement with the said hook.

In testimony whereof I affix my signature.

RAYMOND E. CLASSON.